(12) United States Patent
Watkins

(10) Patent No.: US 6,537,053 B1
(45) Date of Patent: Mar. 25, 2003

(54) MODULAR MOLDING SYSTEM, AND MODULES FOR USE THEREWITH

(75) Inventor: Harold C. Watkins, Franklin, OH (US)

(73) Assignee: Plastic Moldings Company, LLC, Cincinnati, OH (US)

(*) Notice: Subject to any disclaimer, the term of this patent is extended or adjusted under 35 U.S.C. 154(b) by 0 days.

(21) Appl. No.: 09/494,056

(22) Filed: Jan. 28, 2000

(51) Int. Cl.⁷ ................. B29C 43/50; B29C 45/40
(52) U.S. Cl. ............... 425/190; 249/68; 425/351; 425/444; 425/546; 425/547; 425/556
(58) Field of Search ................. 425/190, 351, 425/422, 444, 554, 556, DIG. 58, 546, 547; 249/66.1, 67, 68, 70

(56) References Cited

U.S. PATENT DOCUMENTS

| | | | |
|---|---|---|---|
| 2,719,326 A | 10/1955 | Dykehouse | |
| 3,025,570 A | 3/1962 | Halward | |
| 3,197,825 A | * 8/1965 | Hammond | 164/345 |
| 3,233,288 A | 2/1966 | Strauss | |
| 3,266,086 A | 8/1966 | Markevitch | |
| 3,351,691 A | 11/1967 | Wilford | |
| 3,516,302 A | 6/1970 | Muttart | |
| 3,893,644 A | 7/1975 | Drazick | |
| 4,009,979 A | 3/1977 | Martin | |
| 4,082,245 A | 4/1978 | Santos | |
| 4,158,910 A | 6/1979 | Hanas et al. | |
| 4,348,165 A | 9/1982 | Vostrovsky | |
| 4,609,341 A | 9/1986 | Müller | |
| 4,671,764 A | 6/1987 | Hehl | |
| 4,793,785 A | * 12/1988 | Osada | 425/116 |
| 4,828,479 A | 5/1989 | Pleasant | |
| 4,861,534 A | 8/1989 | Boehm et al. | |
| 4,867,668 A | 9/1989 | Miyairi | |
| 4,959,002 A | * 9/1990 | Pleasant | 425/192 R |
| 4,966,544 A | 10/1990 | Mitake | |
| 5,074,770 A | * 12/1991 | Graefe | 425/117 |
| 5,261,806 A | 11/1993 | Pleasant | |
| 5,314,323 A | 5/1994 | Bolles | |
| 5,316,467 A | 5/1994 | Starkey | |
| 5,358,396 A | 10/1994 | Antonius Giesen | |

(List continued on next page.)

OTHER PUBLICATIONS

Round Mate Brochure—*Round Mate® Interchangeable Insert Mold System*, (10 pgs.) 1996.
Hasco Brochure—Split Mould Kits, (pp. 1–34), 4/98.
Master Unite Die Products Brochure—The Master Unit Die Concept © 1994, pp. 1–9, 11.

Primary Examiner—Jan H. Silbaugh
Assistant Examiner—Emmanuel Luk
(74) Attorney, Agent, or Firm—Dinsmore & Shohl LLP

(57) ABSTRACT

A modular molding system having: an upper frame assembly configured for receiving a cavity module therein; a lower frame assembly configured for receiving a core module therein, the lower frame assembly including a two-stage master ejector system; a cavity module positioned within the upper frame assembly; and a core module positioned within the lower frame assembly, the core module including a two-stage ejector system having a plurality of ejection elements associated therewith; wherein the core and cavity modules together define a molding cavity for molding a workpiece therein, and wherein the master ejector system is operable to drive the ejection elements of the core module.

15 Claims, 14 Drawing Sheets

U.S. PATENT DOCUMENTS

| | | | |
|---|---|---|---|
| 5,397,226 A | | 3/1995 | Vandenberg |
| 5,492,658 A | * | 2/1996 | Ohno et al. ................. 264/40.1 |
| 5,512,223 A | * | 4/1996 | Morikata ..................... 264/71 |
| 5,536,463 A | | 7/1996 | Baccman |
| 5,551,864 A | | 9/1996 | Boskovic |
| 5,595,771 A | | 1/1997 | Foltuz et al. |
| 5,647,114 A | | 7/1997 | Pleasant |
| 5,658,600 A | | 8/1997 | Okada et al. |
| 5,662,946 A | | 9/1997 | Pratt et al. |
| 5,695,790 A | | 12/1997 | Lin |
| 5,711,971 A | | 1/1998 | vanderSanden |
| 5,731,014 A | | 3/1998 | Travaglini |
| 5,783,234 A | | 7/1998 | Teng |
| 5,814,357 A | | 9/1998 | Boskovic |
| 5,824,249 A | | 10/1998 | Leitch et al. |
| 5,830,515 A | | 11/1998 | Pleasant et al. |
| 5,833,902 A | | 11/1998 | Coxhead et al. |
| 5,855,928 A | | 1/1999 | Takagi |
| 5,885,628 A | | 3/1999 | Swenson et al. |
| 5,895,621 A | * | 4/1999 | Tajiri et al. .................. 264/318 |
| 5,916,603 A | | 6/1999 | Pleasant et al. |
| 5,916,604 A | | 6/1999 | Oshiro et al. |
| 6,196,824 B1 | * | 3/2001 | Foltuz et al. ................ 425/190 |

* cited by examiner

MODULAR MOLDING SYSTEM, AND MODULES FOR USE THEREWITH

BACKGROUND OF THE INVENTION

1. Field of the Invention

The present invention relates to a modular molding system. More particularly, the present invention provides a modular molding system which employs fully contained core and cavity modules.

2. Description of Related Art

Injection molding apparatus often employ a pair of die frame assemblies, each of which is configured to receive a die insert therein. When the die frame assemblies are clamped together, the die inserts cooperate with one another to form a molding cavity therebetween. The molding cavity is shaped to form a specific molded part when plastic material is injected into the cavity. In order to mold a different part, the die inserts must be replaced. One such arrangement is shown in U.S. Pat. No. 4,009,979 ("the '979 patent", which is incorporated herein by way of reference).

While the use of die frame assemblies does provide some degree of die insert interchangeability, die insert changeovers can be time consuming. By way of example, the location of the ejector pins is typically dictated by the die frame assembly. Thus, the die inserts must be configured such that the ejector pins will properly align with the molding cavity formed by the inserts. Although the ejector pins can often be rearranged on the ejector plate, doing so can be time consuming.

If core lifters are required (such as when the part being molded includes undercuts), the entire die frame assembly (or at least the ejector and retainer plates) often must be changed along with the die inserts. At a minimum, the core lifters must be rearranged on the ejector plate so that they will be properly positioned within the molding cavity. Each of these steps adds considerably to changeover time, and increases molding costs (particularly when die insert changeovers are frequent).

Thus, there is a need for a molding system which expedites changeover time without sacrificing any of the functions and features provided by conventional injection mold tooling.

SUMMARY OF THE INVENTION

The present invention provides a modular molding system, comprising:

(a) an upper frame assembly configured for receiving a cavity module therein;

(b) a lower frame assembly configured for receiving a core module therein, the lower frame assembly including a two-stage master ejector system;

(c) a cavity module positioned within the upper frame assembly;

(d) a core module positioned within the lower frame assembly, the core module including a two-stage ejector system having a plurality of ejection elements associated therewith;

wherein the core and cavity modules together define a molding cavity for molding a workpiece therein, and wherein the master ejector system is operable to drive the ejection elements of the core module. The ejection elements may be chosen from the group consisting of ejector pins and core lifters. The master ejector system may comprise first and second master ejector plates, the ejector system of the core module comprises first and second module ejector plates, and at least one of the ejection elements is supported by the first and second module ejector plates. The molding system may further comprise a fluid circuit in at least one of the core module and the cavity module, wherein the fluid circuit is configured such that a fluid may be circulated therethrough. A vacuum circuit may also be provided in at least one of the core module and the cavity module, wherein the vacuum circuit is configured such that a vacuum may be applied to the molding cavity.

DETAILED DESCRIPTION OF THE PREFERRED EMBODIMENTS

Figure 1:
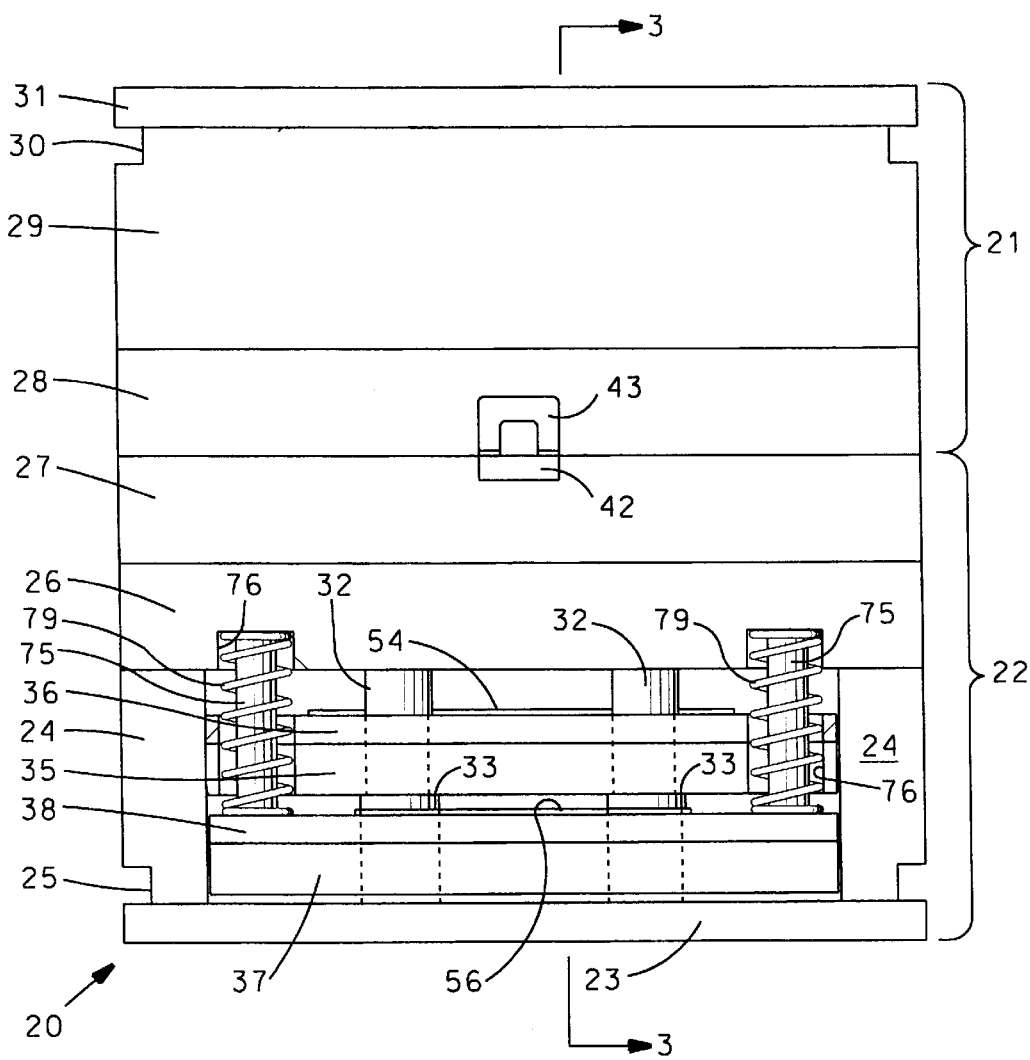
FIG. 1 is an end view of a modular molding system according to one embodiment of the present invention.

The present invention provides a modular molding system for use in, for example, the injection molding of plastic items. This system employs individual core and cavity modules which may be quickly and easily mounted in a frame assembly. The core and cavity modules are fully contained, with all of the mechanical actions (e.g., side actions, ejector pins, core lifters etc.) incorporated into the modules. Each core module includes its own independent, two-stage ejection system which may be configured specifically for the particular core module. The ejector system provided on the core module cooperates with a master ejector system provided in the frame assembly, however, the arrangement of the ejector elements (e.g., ejector pins and/or core lifters) are defined by the core module rather than master ejector system of the frame assembly. Furthermore, side actions, water circuits and/or vacuum circuits may be provided in the core and cavity modules, as desired. In fact, water circuits may even be provided in the side actions provided in the module. The core and cavity modules are also face mountable, thereby facilitating the insertion and removal of the modules while the frame assembly remains in the molding press. Nevertheless, the system of the present invention can be used with conventional molding presses.

FIGS. 1–5 depict an exemplary modular molding system according to one embodiment of the present invention. It should be noted, however, that certain features have been omitted from some of the drawings for purposes of clarity. Although some of such omissions will be pointed out herein, one skilled in the art will recognize where such omissions have been made once the entire specification is considered in its entirety.

Modular molding system 20 generally includes an upper (or stationary) frame assembly 21 and a lower (or movable) frame assembly 22. Upper frame assembly 21 is configured to receive a cavity insert 52 (i.e., the cavity module; see FIG. 2). Lower frame assembly 22, on the other hand, is configured to receive a core module which generally comprises core insert 51 and a two-stage module ejector system (generally provided by plates 53–56). It should be pointed out that, although the specific embodiment of the molding system described herein includes a two-stage ejector system, the present invention may also employ a single stage ejector system.

Figure 2:
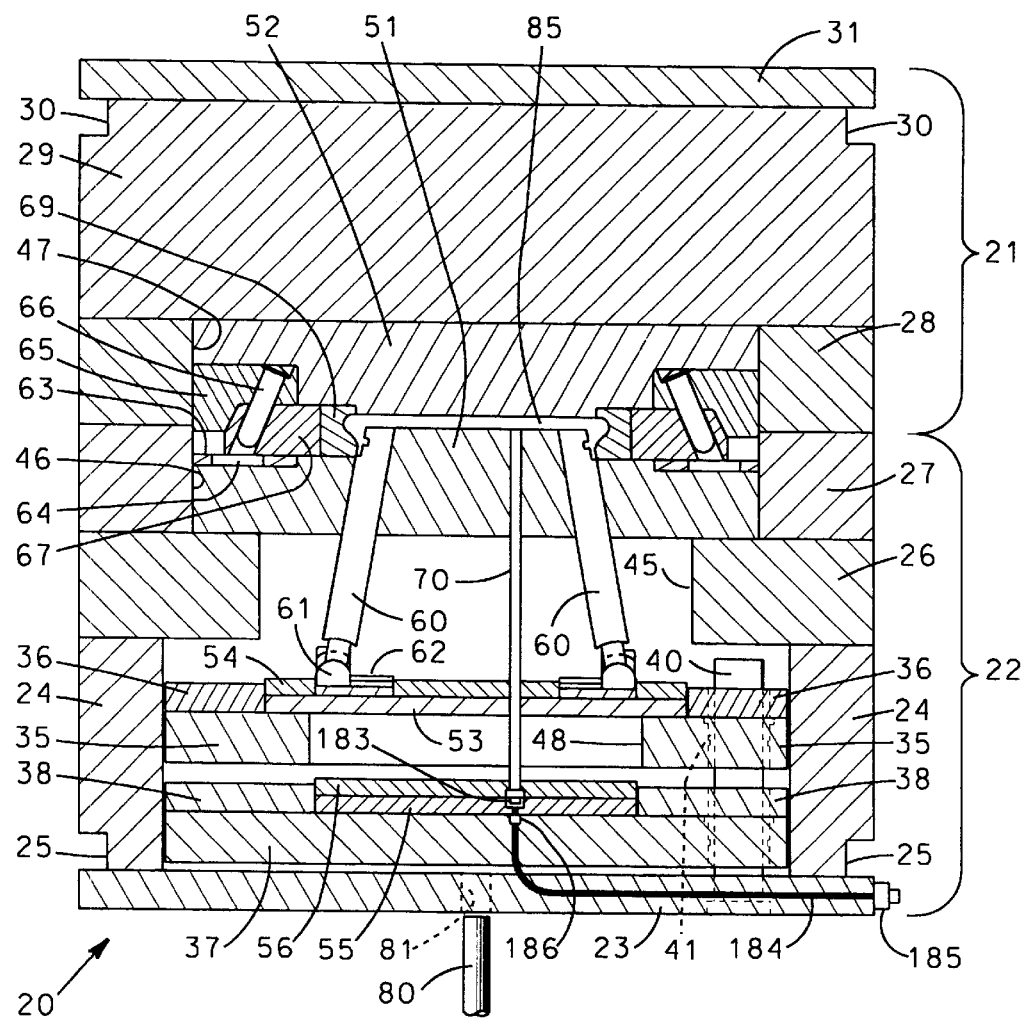
FIG. 2 is a sectional view of the modular molding system of FIG. 1.
Figure 3:
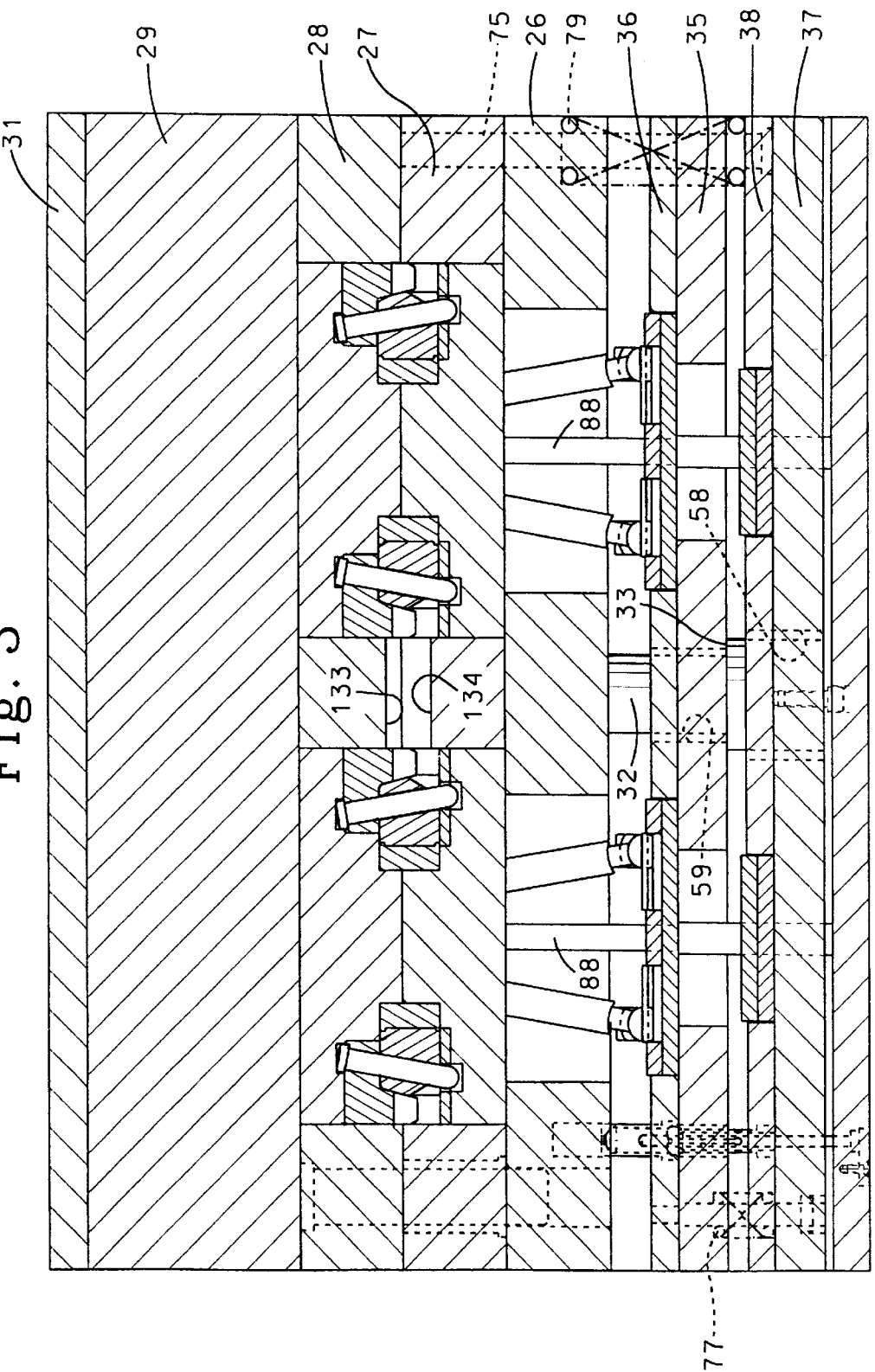
FIG. 3 is a sectional view of the system of FIG. 1, taken along line 3—3 thereof, wherein details of the molding cavity, core lifters and slide inserts have been omitted for purposes of clarity.

As best seen in FIGS. 1 and 2, lower frame assembly 22 generally comprises a bottom clamp plate 23 and a pair of rails 24 which extend lengthwise along the periphery of bottom clamp plate 23. Each rail 24 includes a groove 25 which extends along the base of the rail adjacent bottom clamp plate 23. Grooves 25 are configured for securing the lower frame assembly in a conventional molding press, in a manner known to those skilled in the art. As best seen in FIGS. 2 and 3, rails 24 define a space therebetween which accommodates the master ejector system of the frame assembly. It will be understood that a one piece "ejector housing" may be employed, wherein bottom clamp plate 23 and rails 24 comprise a single, unitary structure.

Figure 1A:
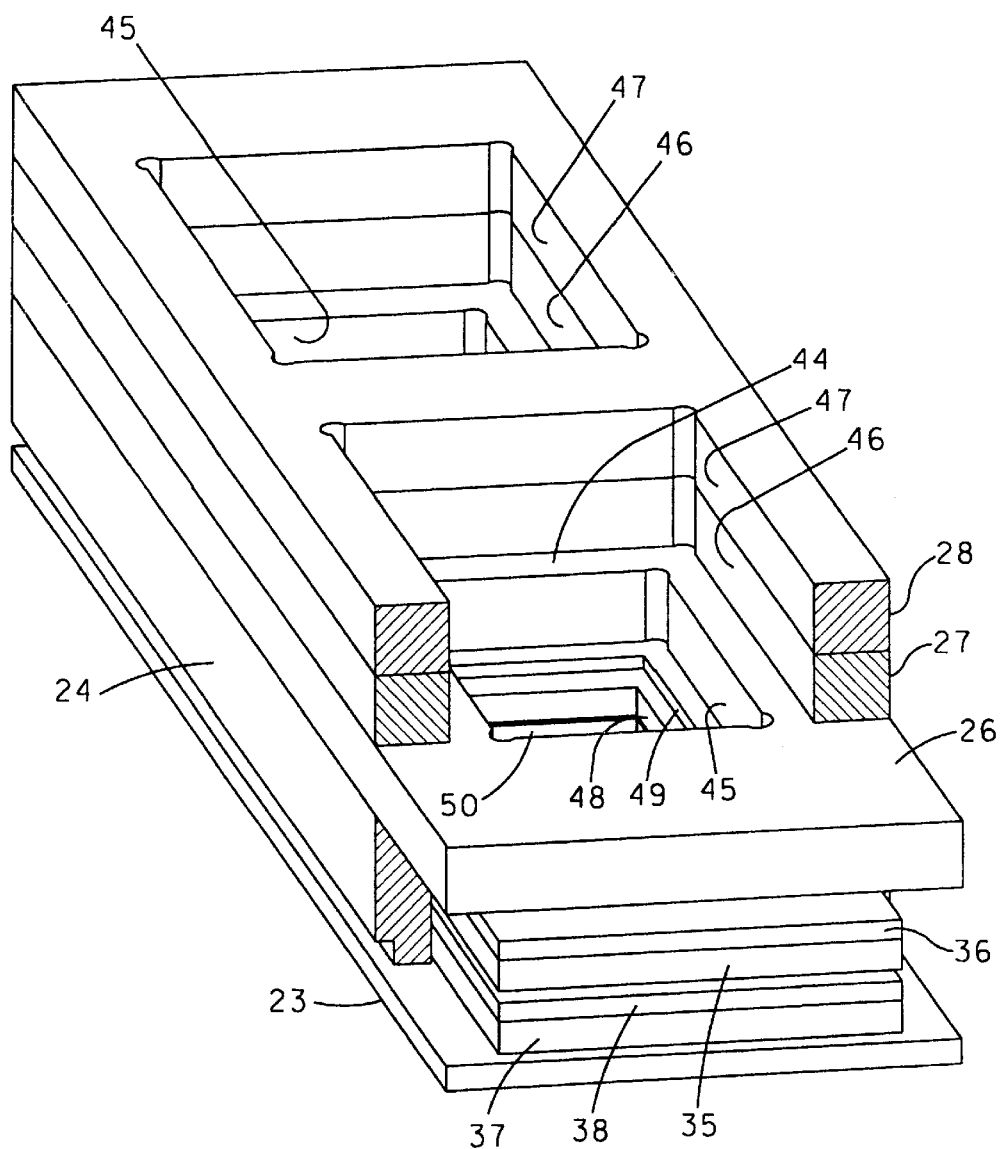
FIG. 1A is a perspective, schematic view of the lower frame assembly and "A" plate of the modular molding system of FIG. 1.

Lower frame assembly 22 further includes a support plate 26 which is supported by rails 24, as well as a plurality of support pillars 32. As best seen in FIG. 1A, support plate 26 includes a center beam 44 which extends widthwise across the lower frame assembly. In this manner, support plate 26 includes a pair of rectangular openings 45, each of which is configured to allow the ejector system of a core module to pass therethrough during mounting of the core module. As one skilled in the art will recognize, the modular molding system of the present invention can be configured to receive any number of core and cavity modules, and the dual molding arrangement shown in the accompanying figures is merely exemplary of one possible embodiment.

Lower frame assembly 22 also includes a "B" plate 27 which is mounted upon support plate 26. B plate 27 is similar in configuration to support plate 26, however the rectangular openings 46 provided in B plate 27 are somewhat larger (in both length and width) than the corresponding rectangular openings 45 provided in support plate 26. Rectangular openings 46 of B plate 27 are sized and configured such that a core insert 51 may be positioned within a rectangular opening 46, resting upon support plate 26 (see FIG. 2, for example). In this manner, core insert 51 will be supported about its periphery by support plate 26.

As one skilled in the art will recognize, the various plates and rails comprising lower frame assembly 22 (as well as those comprising upper frame assembly 21, described below) may be secured to one another by a plurality of threaded fasteners or other suitable means known to those skilled in art. For example, socket head cap screws ("SHCS") may be used for this purpose. It should be pointed out, however, that these fasteners are generally not depicted in the accompanying drawings for purposes of clarity.

Upper frame assembly 21 generally comprises a top clamp plate 31, and a manifold plate 29 secured thereto. Manifold plate 29 includes a pair of grooves 30 which extend lengthwise along the upper edge of manifold plate 29 adjacent top clamp plate 31. Like grooves 25 in the lower frame assembly, grooves 30 are configured so that upper frame assembly 21 may be secured in a mold press in the conventional manner. Upper frame assembly 21 further includes an "A" plate 28 which is secured to manifold plate 29. "A" plate 28 may be configured similarly to B plate 27, and therefore includes a pair of rectangular openings 47 (see FIG. 1A). Each rectangular opening 47 is sized and configured such that a cavity insert 52 may be positioned within a rectangular opening 47, against manifold plate 29. Once again the various plates of upper frame assembly 21 may be secured to one another by means of threadable fasteners (or other suitable means) which are not shown in the accompanying drawings.

As is known in the art, one or more locking members may be provided adjacent the exterior surfaces of the molding system in order to facilitate proper engagement of the upper and lower frame assemblies. For example, male and female locking members 42 and 43, respectively, may be provided about the periphery of the molding system, as seen in FIG. 1. Male locking member 42 may be attached to B-plate 27, while female locking member is attached to A-plate 28, in alignment with male locking member 42. In addition, one or more guide posts 39 (see FIGS. 3 and 6) may be carried by the upper or lower frame assemblies, such as A-plate 28. Corresponding bores 57 may be provided in B-plate 27 and support plate 26 (see FIG. 3). In this manner, guide posts 39 will further assist in properly aligning the lower and upper frame assemblies when the molding press is closed, as well as aligning the core and cavity inserts.

As mentioned previously, a master ejector system may be provided in lower frame assembly 22, and preferably comprises a two-stage master ejector system. Thus, as best seen in FIG. 2, the master ejector system comprises a first master ejector plate 35 and a second master ejector plate 37. First and second master ejector plates 35 and 37 are configured for independent, reciprocal movement within the chamber defined between rails 24 above lower clamp plate 23, and are employed to drive ejector elements such as ejector pins and/or core lifters which are provided on the module ejector system. For example, first master ejector plate 35 may be used to drive one or more core lifters 60, while second master ejector plate 37 is used to drive one or more ejector pins 70 independently of the core lifters.

As will be noted from FIGS. 1A and 3, master ejector plates 35 and 37 preferably extend the entire length of lower frame assembly 22. Since multiple support pillars 32 may be located between support plate 26 and bottom clamp plate 23 (see FIG. 9), apertures are provided in ejector plates 35 and 37 so that pillars 32 may extend therethrough. It should be noted that the pillars 32 have been omitted from FIGS. 1A and 2 for clarity.

As shown in FIGS. 1 and 3, support pillars 32 may be configured such that the diameter of the lower portion of each pillar is greater than the diameter of the upper portion, thereby providing an annular shoulder 33 which extends about the circumference of each support pillar. First master ejector plate 35 has a plurality of apertures 58 (FIG. 3) therein for accommodating the upper portion of each support pillar 32. The diameter of apertures 58 is preferably larger than the diameter of the upper portion of each support pillar, and less than the diameter of the lower portion of each support pillar 32. In this manner, first master ejector plate 35 may rest upon shoulder 33 of each support pillar 32, such that shoulders 33 will limit the downward movement of first ejector plate 35. Second master ejector plate 37 may similarly have a plurality of apertures 59 therein for accommodating the upper portion of support pillars 32. The diameter of apertures 59 in second ejector plate 37, however, is preferably greater than the diameter of the lower portion of each support pillar 32, such that second ejector plate 37 may rest upon shoulders 33 and move reciprocally along the upper portion of support pillars 32.

Figure 4:
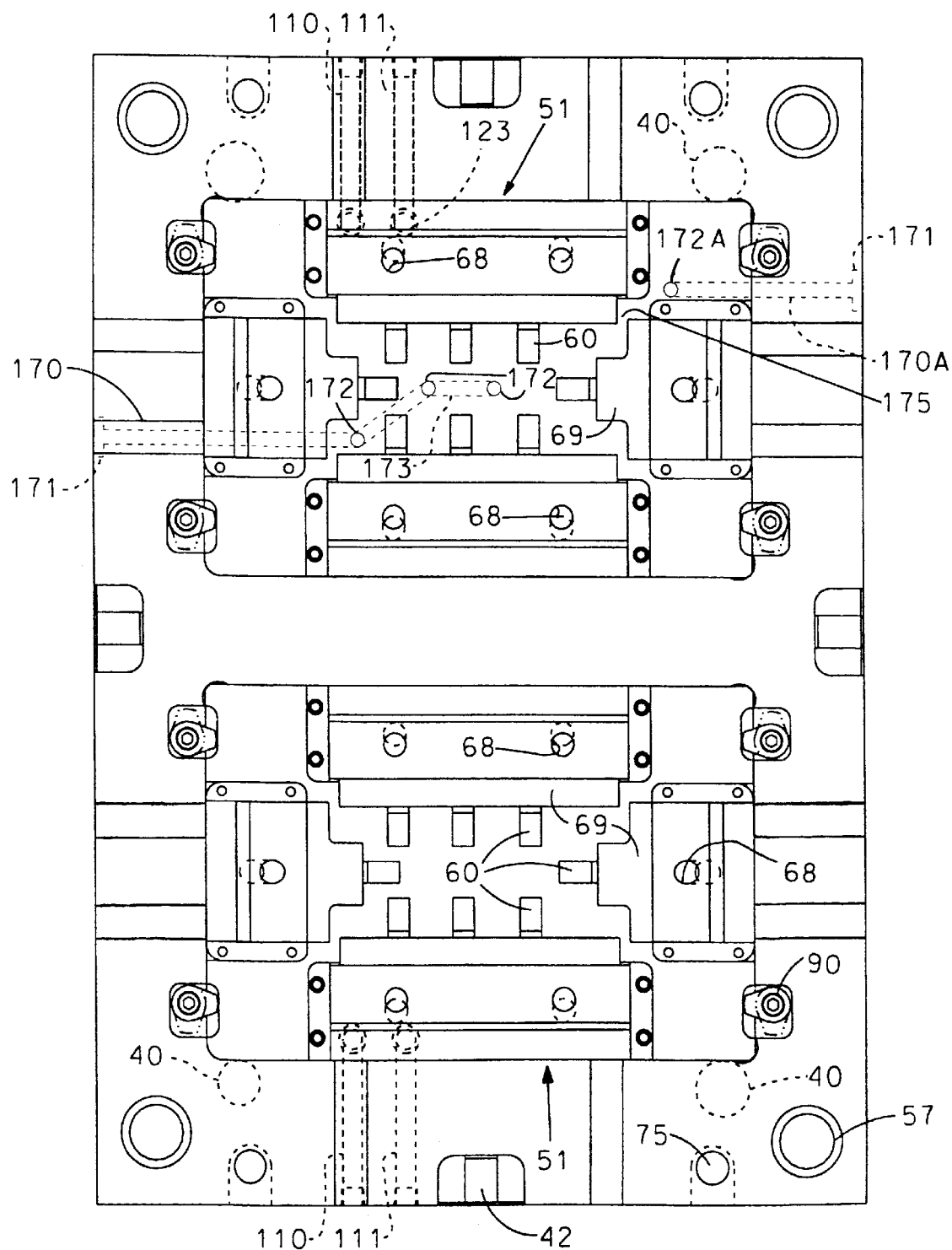
FIG. 4 is a top plan view of the lower half of the system of FIG. 1.

In order to ensure that first and second master ejector plates 35 and 37 reciprocate smoothly between bottom clamp plate 23 and support plate 26, one or more guide pins 40 may be provided (see FIGS. 2 and 4). Guide pins 40 ensure that the master ejector plates move smoothly, so that the ejector pins and core lifters (described below) also will move smoothly within core insert 51. As best seen in FIG. 2, each guide pin 40 extends through first and second master ejector plates 35 and 37, and is secured to bottom clamp plate 23. By way of example, the lower end of each guide pin 40 may include an enlarged head which snugly fits into a counterbore in bottom clamp plate 23 (see FIG. 2). Lubricated guide bushings 41 may also be provided in first and second master ejector plates 35 and 37 in order to stabilize the master ejector plates, as well as guide their reciprocal movement along guide pins 40, thus providing a guided ejector system.

First master ejector plate 35 is preferably configured similar to support plate 26 in that it includes a pair of rectangular openings 48 therein (see FIGS. 1A and 2). The dimensions of rectangular openings 48 in first master ejector plate 35 (in terms of both length and width), however, are preferably smaller than the dimensions of rectangular openings 45 in support plate 26. In this manner, first master ejector plate 35 will support the first ejector plate of a core module (as further described below).

Figure 9:
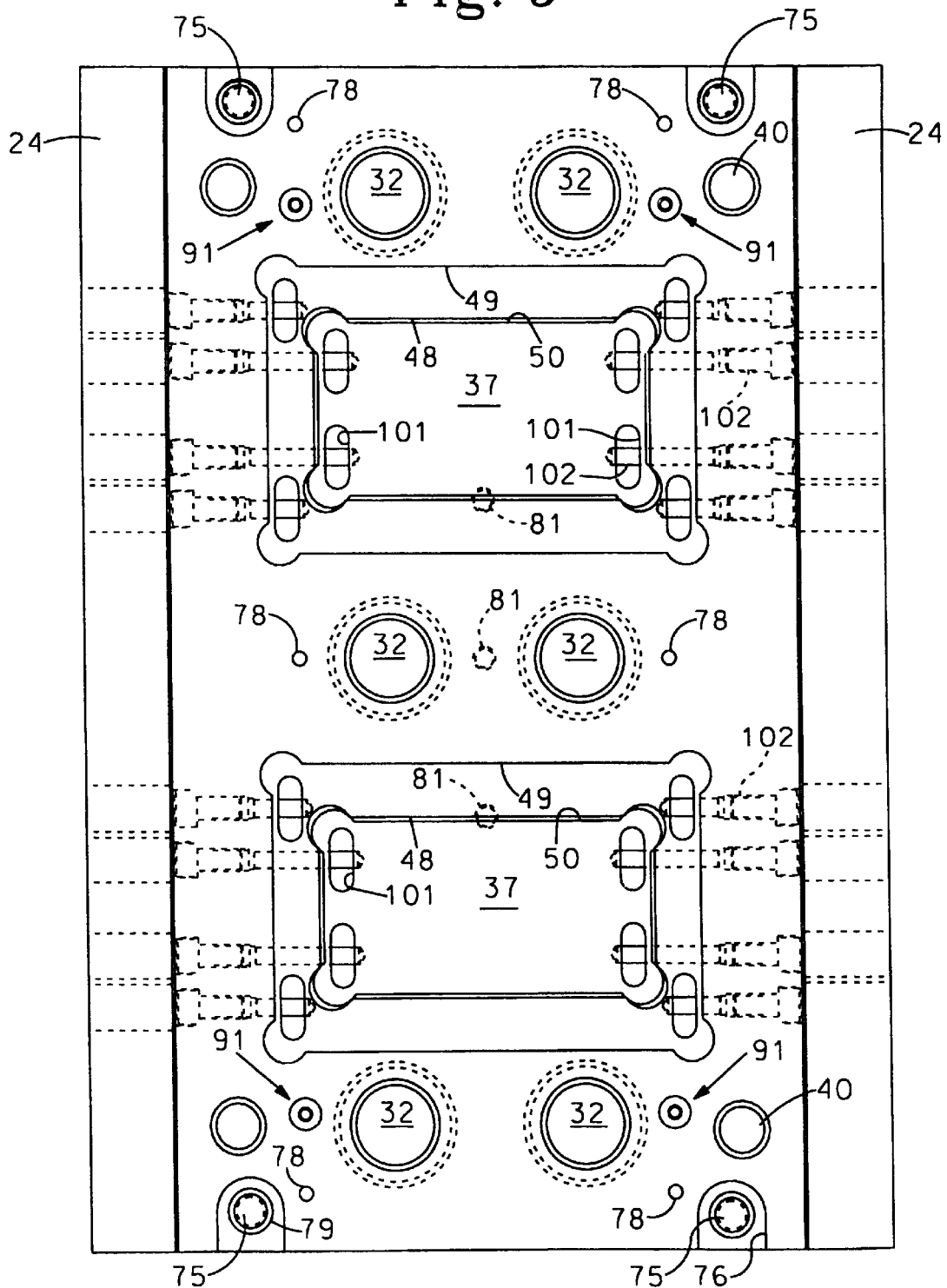
FIG. 9 is a top plan view of the ejector housing and the master ejector system of the modular molding system of FIG. 2.

The master ejector system of the frame assembly may also include first and second retainer plates 36 and 38 secured to first ejector plate 35 and second ejector plate 37, respectively (see FIG. 2). As best seen in FIGS. 1a and 9, first and second retainer plates 36 and 38 are configured similar to support plate 26, and thus each has a pair of rectangular openings defined therein. The dimensions of rectangular openings 49 in first retainer plate 36 may be only slightly smaller (preferably both in length and width) than the dimensions of rectangular openings 45 in support plate 26. The dimensions of rectangular openings 50 in second retainer plate 38 are preferably smaller (in both length and width) than the dimensions of rectangular openings 49 in first retainer plate 36, and are slightly smaller than the dimensions of rectangular openings 48 in first master ejector plate 35 (as best seen in the width and length section views of FIGS. 2 and 3).

As further discussed herein, the size of rectangular openings 48 in first master ejector plate 35 and rectangular openings 49 in first master retainer plate 36 are such that a first module ejector plate 53 may be snugly positioned within a rectangular opening 49 of first retainer plate 36, resting upon first ejector plate 35. Similarly, rectangular openings 50 in second retainer plate 35 are preferably sized such that a second module ejector plate 55 may be snugly positioned within a rectangular opening 50, resting upon second ejector plate 37.

As will be more fully described herein, the master ejector system provided in lower frame assembly 22 need not include any ejector elements. In fact, the master ejector system of the frame assembly does not directly act upon the molding cavity. Rather, the master ejector system of the frame assembly transfers the reciprocal movement of its ejector plates 35 and 37 to the module ejector system. The master ejector system of the frame assembly may be configured to cooperate with conventional mold presses such that one or more knockout rods of the mold press will initiate upward movement of master ejector plates 35 and 37. This upward movement of master ejector plates 35 and 37 is transferred to module ejector plates 53 and 55.

As best seen in FIGS. 2 and 9, bottom clamp plate 23 includes one or more apertures 81 which are configured to align with one or more press knockout rods 80 of the molding press. The molding press may include a plurality of knockout rods 80, and thus bottom clamp plate 23 may include a plurality of apertures 81 located and sized such that each will allow the passage of a press knockout rod 80 therethrough. In conventional injection molding presses, the lower portion of the mold press moves away from the upper portion of the mold press in order to open the press. Thus, when the molding operation is completed, lower frame assembly 22 will be moved downwardly away from upper frame assembly 21 by the mold press. Press knockout rods 80, however, remain stationary such that each knockout rod 80 will be directed into a corresponding aperture 81 in bottom clamp plate 23 and will bear against the lower surface of second master ejector plate 37. Second master ejector plate 37 will thus be urged upwardly with respect to lower frame assembly 22, along guide pins 40.

Since second module ejector plate 55 is supported by second master ejector plate 37, second module ejector plate 55 will likewise be urged upwardly with respect to lower frame assembly 22. As further described herein, second module ejector plate 55 may have one or more ejector elements (such as ejector pin 70) associated therewith which are arranged for ejecting a molded part from the molding cavity. Thus, as second module ejector plate 55 is urged upwardly by second master ejector plate 37, the ejector elements (e.g., pin 70 in FIG. 2) will be urged upwardly into the molding cavity in order to eject a molded part from the cavity.

While the modular molding system of the present invention may employ a single-stage ejector system wherein first master ejector plate 35 is omitted, a preferred embodiment employs a two-stage ejector system wherein the ejection elements (e.g., ejector pins and core lifters) may be driven in two stages. For example, one set of ejection elements may be driven faster than the other set of ejection elements in order control the ejection of a molded part, or one set of ejector elements may be driven through a greater distance than the other set (as described below).

In the embodiment shown, first master ejector plate 35 is spring-biased upwardly away from second master ejector plate 37. Spring biasing may be provided, for example, by one or more springs 77 which extend around shoulder bolts 78 secured to first master ejector plate 35 (see FIGS. 3 and 7). As before, when molding has been completed the lower frame assembly moves downwardly away from the upper frame assembly and press knockout rod 80 urges second ejector plate 37 upwardly. First ejector plate 35 also will be urged upwardly away from second ejector plate 37 by springs 77, ahead of second master ejector plate 37. In this manner, first module ejector plate 53 which rests upon first master ejector plate 35 will likewise be urged upwardly, ahead of second master ejector plate 37. Thus, core lifters 60 carried by first module ejector plate 53 will be urged upwardly into the molding cavity at the same time as ejector pins 70.

Figure 7:
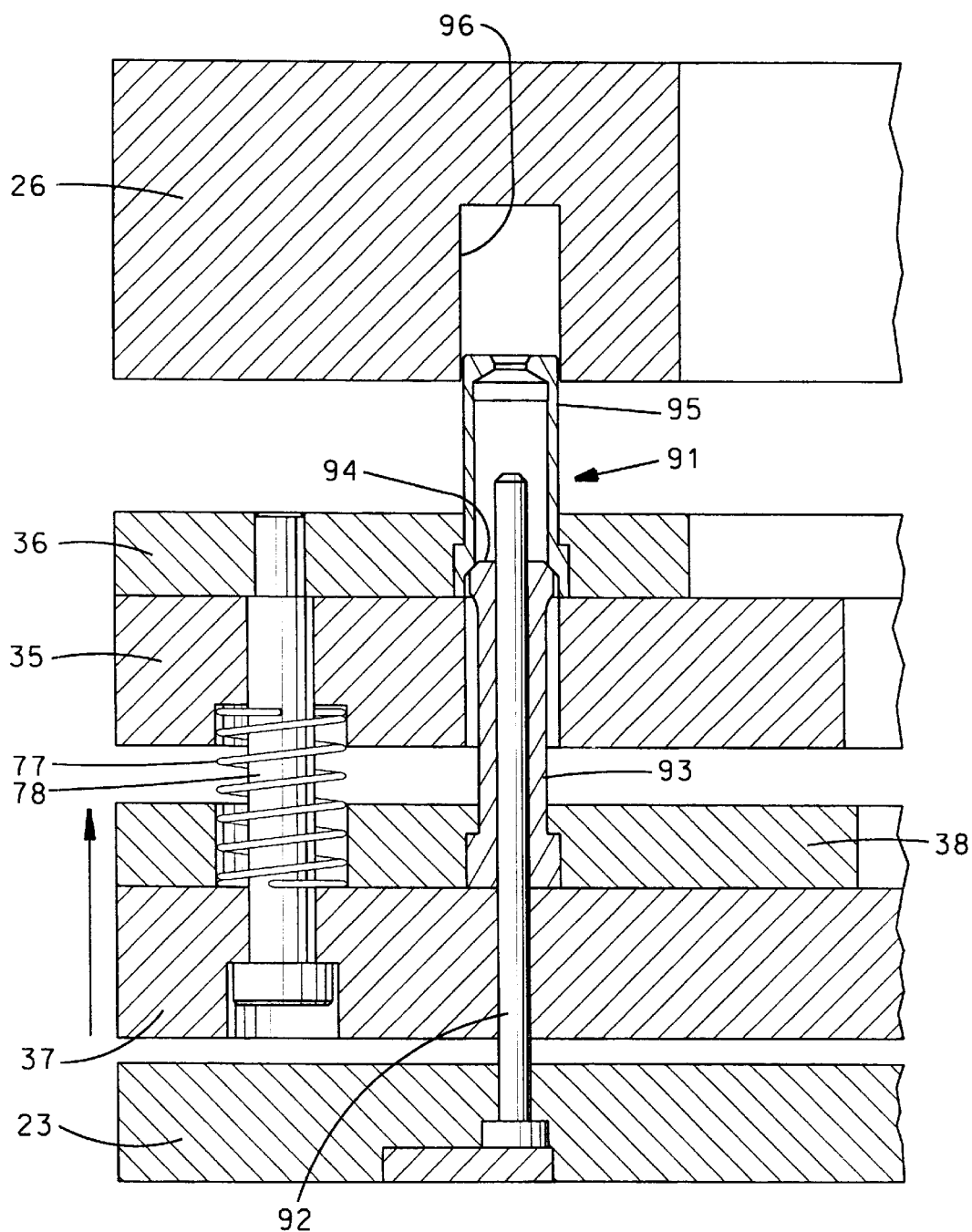
FIGS. 7 and 8 are cross-sectional views of the a portion of the molding system of FIG. 2, wherein the operation of the two-stage ejection system is depicted.
Figure 8:
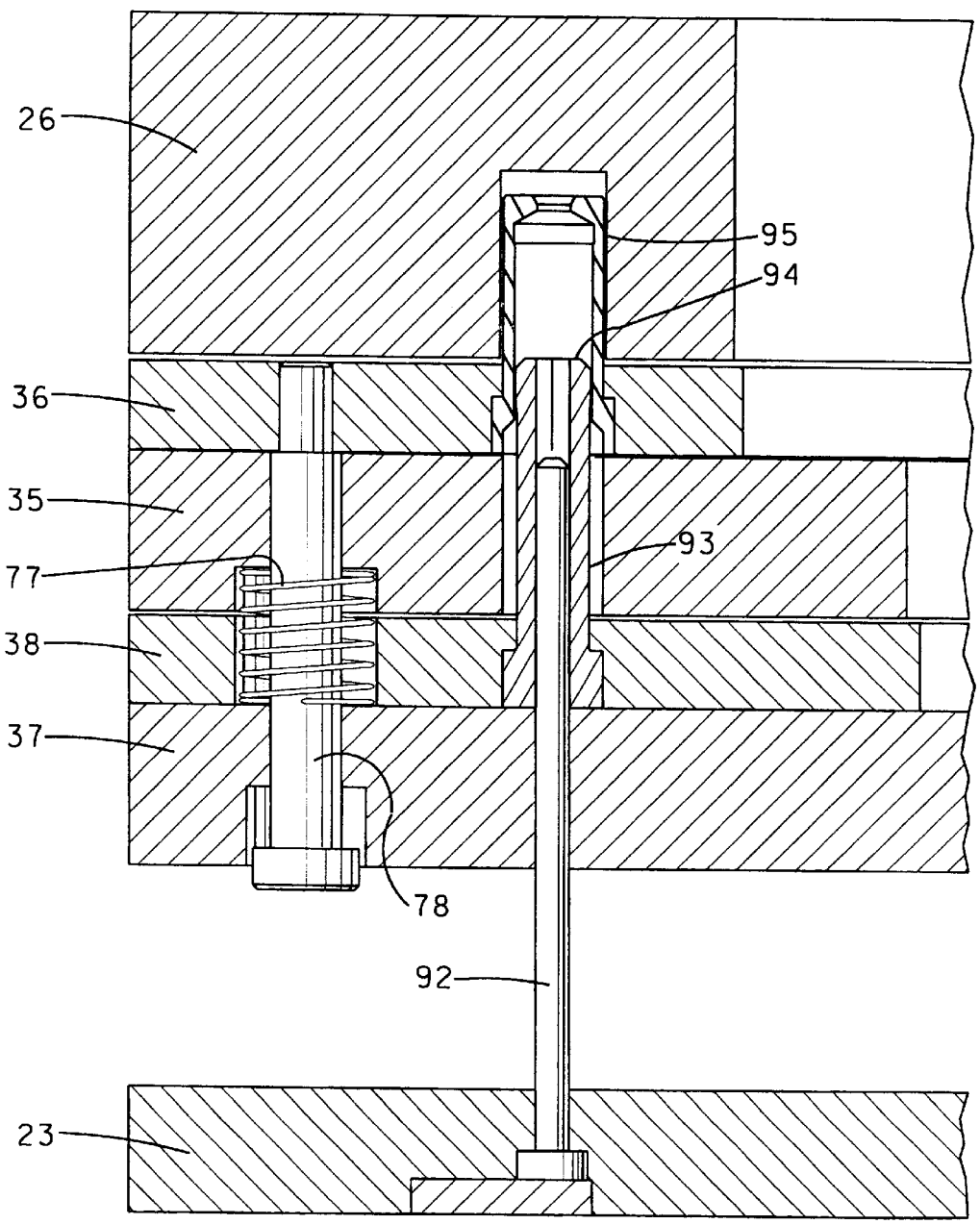

In order to further facilitate upward movement of first master ejector plate 35 ahead of second master ejector plate 37, one or more friction retainer mechanisms may also be provided. As best seen in FIG. 9, four such friction retainer mechanisms 91 are provided in the exemplary embodiment shown. FIGS. 7 and 8 are enlarged cross-sectional views which depict the operation of friction retainer mechanisms 91 (also commonly referred to as "early return" mechanisms). An elongate rod 92 is secured to bottom clamp plate 23, and extends upwardly through bores provided in second master ejector plate 37, second master retainer plate 38, first master ejector plate 35 and first retainer plate 36. When the ejector system is in its retracted position of FIG. 7, rod 92 extends to a point slightly above first retainer plate 36, as shown.

Friction retainer mechanism 91 generally comprises a lower portion 93 secured to second master ejector plate 37, and an upper portion 95 secured to first master ejector plate 35. Upper and lower portions 95 and 93 are aligned with one another, such that lower portion 93 may be urged upwardly into a bore provided in the interior of upper portion 95. Lower portion 93 of friction retainer mechanism 91 also includes an enlarged, collapsible head 94 at its upper end. When the ejector system is in its retracted position of FIG. 7, rod 92 extends upwardly through lower portion 93, including collapsible head portion 94. Rod 92 prevents head portion 94 from collapsing inwardly, thus locking head portion 94 in the lower end of upper portion 95 of friction retainer 91. In other words, head portion 94 is prevented from traveling upwardly into the interior of upper portion 95.

As the press knockout rods urge second master ejector plate 37 upwardly in the direction of the arrow shown in FIG. 7, the locking of head portion 94 within the lower end of upper portion 95 will in turn lock first master ejector plate 35 to second master ejector plate 37. Thus, first master ejector plate 35 will also be urged upwardly. Eventually, first master retainer plate 36 will contact support plate 26, thus preventing further upward movement of first master ejector plate 35. As illustrated in FIGS. 7 and 8, the support plate 26 can include a bore 96 to receive portions of the retainer mechanism 91 as the master retainer plate 36 moves towards the support plate 26. Stops may also be provided on the upper surface of plate 36 to limit upward movement of plate 36. As second master ejector plate 37 is continued to be urged upwardly by the press knockout rods, however, head portion 94 of lower portion 93 of the retainer mechanism will be advanced beyond the upper end of rod 92. This allows head portion 94 to collapse inwardly such that head portion 94 may advance upwardly into the bore provided in upper portion 95 of the retainer mechanism. In this manner, even though upward movement of first master ejector plate 35 has ended, second master ejector plate 37 will continue to be urged upwardly (e.g., until it contacts first master ejector plate 35). In this manner, the ejector elements carried by the second module ejector plate 55 are driven through a greater distance (i.e., stroke) than the ejector elements carried by the first module ejector plate 53.

Return pins may also be provided in the lower frame assembly in order to return master ejector plates 35 and 37 to their retracted positions (FIG. 2) when the molding press is closed. Each return pin 75 is preferably secured to second master ejector plate 37 and/or second master retainer plate 38. As best seen in FIG. 3, each return pin 75 may include an enlarged head which snugly fits into a counterbore in second master retainer plate 38, such that return pin 75 will move with second master ejector plate 37. Return pin 75 extends upwardly through second master retainer plate 38, first master ejector plate 35, second master retainer plate 36, support plate 26 and B plate 27.

When second master ejector plate 37 is in its retracted position (FIGS. 1 and 3), the upper end of return pin 75 does not extend above B plate 27. When the molding press is opened and second ejector plate 37 is urged upwardly by knockout rod 80, return pin 75 will likewise be urged upwardly such that the upper end of return pin 75 will extend above the upper surface of B plate 27. When the molding press is closed, however, "A" plate 28 will bear against the upper end of return pin 75, thus urging return pin 75 and second ejector plate 37 downwardly with respect to the lower frame assembly, thereby returning second ejector plate 37 to its retracted position. Any number of return pins 75 may be provided, such as the four return pins depicted in FIG. 9.

It will also be noted from FIG. 1 that a return spring 79 may be positioned about each return pin 75, with a suitable cutout portion 76 provided in first master ejector and retainer plates 35 and 36, and optionally a portion of support plate 26. Cutout portion 76 allows for free movement of return spring 79 therein. Return spring 79 bears against second master retainer plate 38 and support plate 26, and biases these two plates away from one another. In this manner, return springs 79 will assist in returning second master ejector plate 37 to its retracted position as the mold is closed (i.e., as the press knockout rods move downwardly away from second master ejector plate 37).

As second master ejector plate 37 is returned to its retracted position by return pins 75 and return springs 79, friction retainers 91 will also help to return first master ejector plate 35 to its retracted position. As second master ejector plate 37 is urged downwardly, pin 92 (see FIGS. 7 and 8) will be urged into head portion 94 of lower portion 93 of the retainer mechanism, thereby returning head portion 94 to its expanded (i.e., uncollapsed) state. Head portion 94 will thus be locked in the lower end of upper portion 95 of the retainer mechanism, which in turn locks first master ejector plate 35 to second master ejector plate 37. In this manner, as return pins 75 and return pins 79 continue to return second master ejector plate 37 to its retracted position, first master ejector plate 35 will follow until the fully retracted state of FIG. 7 is reached.

Figure 6:
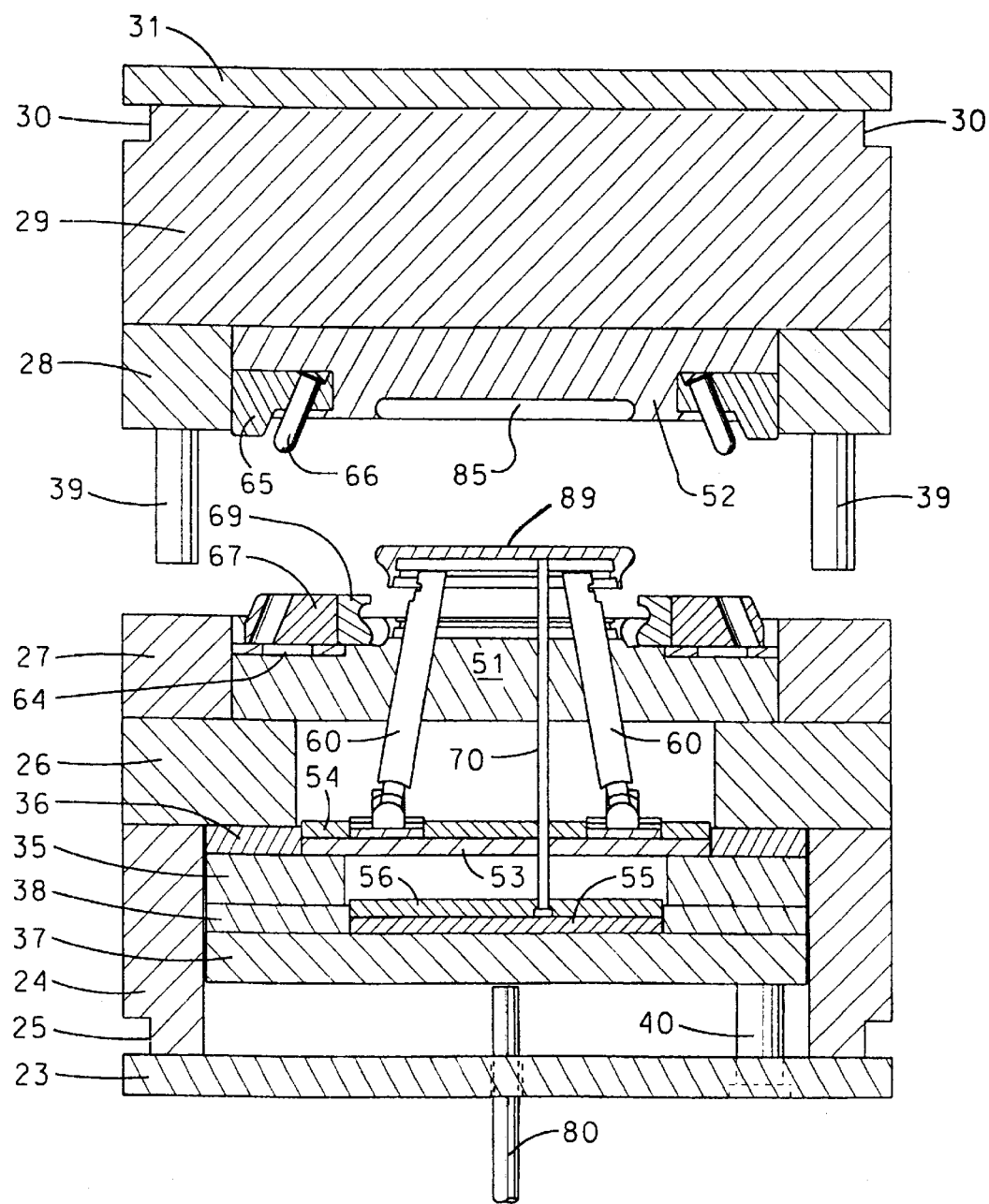
FIG. 6 is the same view as FIG. 2, wherein the molding system has been opened in order to remove a molded part therefrom.

Turning to the core and cavity modules, core insert 51 and cavity insert 52 cooperate with one another to form a molding cavity 85 therebetween (see FIG. 2). Molding cavity 85 is configured for molding one or more parts when plastic material is injected into the molding cavity. After injection of the plastic material, the plastic will solidify in the molding cavity. Shrinkage of the plastic, however, will tend to retain the molded part in the molding cavity, particularly against core insert 51. In addition, when the molded part includes undercuts, the part will be further retained within core insert 51. In order to urge the molded part out of core insert 51 after molding has been completed, one or more ejector elements such as ejector pins 70 extend upwardly through core insert 51 towards molding cavity 85, as shown. As discussed previously, when the molding press is opened, the ejector system will urge ejector pins 70 towards cavity insert 52 such that the upper end of each ejector pin will enter molding cavity 85 and bear against the molded part. In this manner, the molded part will be urged away from core insert 51 by ejector pins 70 such that it can be easily removed therefrom, as shown in FIG. 6.

Ejector pins 70 are carried by one of the module ejector plates, such as second module ejector plate 55, and are secured thereto by means of second module retainer plate 56. Each ejector pin 70 may have an enlarged head portion which is held within a counterbore provided in second module retainer plate 56. Second module ejector plate 55 and second module retainer plate 56 may have a similar or even identical rectangular shape, and are sized and configured to fit snugly within one of the rectangular openings 50 provided in second retainer plate 38 of the frame ejector system. Thus, second module ejector plate 55 will be supported by second master ejector plate 37. In this manner, the master ejector system provided in the frame assembly drives ejector pins 70 of the core insert module into molding cavity 85. The location of ejector pins 70, however, is defined by the core insert module, rather than the master ejection system. Thus, mold changeovers are greatly simplified since, for example, it is not necessary to rearrange the ejector pins or change out the injection system of the frame assembly itself.

Figure 10:
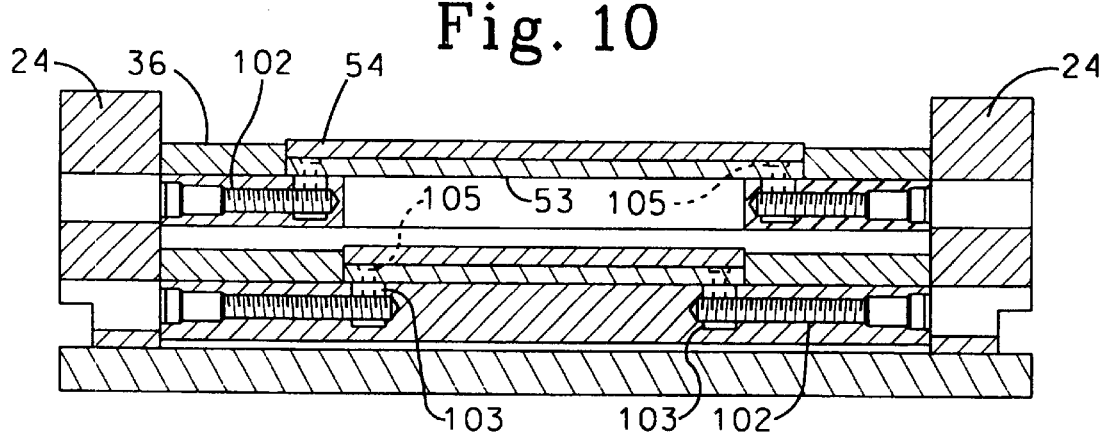
FIG. 10 is a cross-sectional view of the ejector housing and the ejector system of the modular molding system of FIG. 2, and depicts the manner in which the module ejector plates are secured to the master ejector plates.
Figure 11:
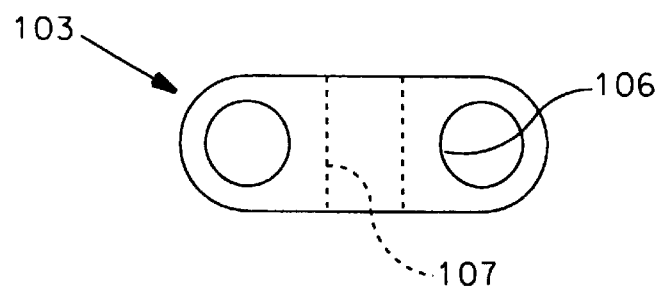
FIG. 11 is top plan view of a lock member which may be used to secure a module ejector plate to a corresponding master ejector plate.
Figure 12:
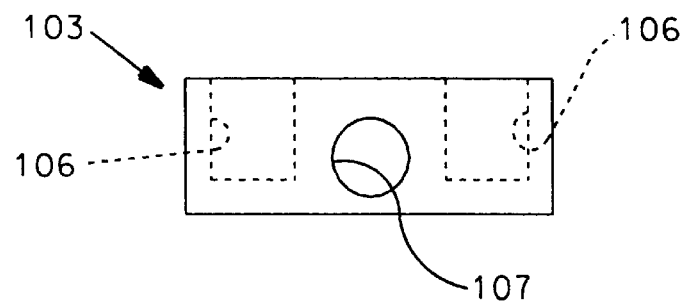
FIG. 12 is a side plan view of the lock member of FIG. 11.

Second module ejector plate 55 may be secured to second master ejector plate 37 in a variety of manners. For example, as best seen in FIG. 9, a plurality of elliptical openings 101 may extend through second master ejector plate 37. A threaded fastener 102 (such as a SHCS) may extend through rails 24 so as to pass directly beneath each elliptical opening 101. An eliptical lock member 103 (see FIGS. 10–12) is secured to the underside of second master ejector plate 37, such as by means of a pair of threaded fasteners 105 which are secured in a pair of threaded bores 106 in lock member 103. Lock member 103 includes another threaded bore 107 which extends normal to bores 106. Bore 107 is sized and located such that threaded fastener 102 may be secured therein, thus securing second module ejector plate 55 to second master ejector plate 37 (as best seen in FIG. 10).

The core module may also include a first module ejector plate 53 which may be used to support and drive additional ejection elements, such as lifter assemblies. As is known to those skilled in the art, lifter assemblies typically comprise a core lifter blade 60, which is pivotally attached to a U-coupling 61. U-coupling 61 is slidably supported by a T-gib 62, as shown in FIG. 2. It will be understood, however, that various other commercially-available lifter assemblies may be used in place of that shown which is merely exemplary. The upper end of each core lifter blade 60 is configured to correspond to a molded undercut in the molded part, and the core lifter blades serve to release the molded undercuts after molding has been completed.

A first module retainer plate 54 is also provided, and is secured to first module ejector plate 53. First module retainer plate 54 may include a plurality of openings therein, each of which is sized and configured to receive a T-gib 62 of a lifter assembly. Each T-gib 62 may be secured to first module ejector plate 53 by, for example, one or more threaded fasteners.

First module ejector plate 53 and first module retainer plate 54 may have a similar or even identical rectangular shape and configuration, and are sized to fit snugly within a rectangular opening 49 of first master retainer plate 36. Thus, first module elector plate 53 is supported about its periphery by first master ejector plate 35. In this manner, first master ejector plate 53 may be used to drive the ejector elements carried by first module ejector plate 35 (e.g., core lifter blades 60) upwardly into molding cavity 85. First module ejector plate 53 may be secured to first master ejector plate 35 in the same manner that second module ejector plate 55 is secured to second master ejector plate 37 (i.e., using threaded fasteners and lock members extending away from the underside of first module ejector plate 53).

As best seen in FIG. 3, each core module may further include one or more ejector support pillars 88 in order to keep the module ejector system in one piece during installation of the core module. Pillars 88 may be configured, for example, so as to extend downwardly away from the core insert 51, through first and second module ejector and retainer plates 54, 53, 55 and 56 and through second master ejector plate 37 to bottom clamp plate 23. Suitable bores are provided in plates 37, 53, 54, 55 and 56 to allow for reciprocal movement of these plates as described previously, without interference by pillars 88. A shoulder may also be provided on pillars 88, as shown, such that the shoulder will act as a stop which limits downward movement of first module ejector plate 53.

When molding is completed and the molding press is opened (FIG. 6), as first master ejector plate 35 is urged upwardly by springs 77, core lifter blades 60 are urged upwardly into molding cavity 85. Since core lifter blades 60 extend upwardly through core insert 51 at an angle, the upward movement of core lifter blade 60 will cause the upper end of each core lifter blade to move inwardly away from the undercuts of the molded part, such that the undercuts are released.

As discussed previously, when the molding press is closed, the master ejector system (including both first master ejector plate 35 and second master ejector plate 37) are returned to their retracted position for the subsequent molding of another part (as shown in FIG. 2). Since first module ejector plate 53 and second module ejector plate 55 are supported by and secured to first master ejector plate 35 and second master ejector plate 37, respectively, the module ejector plates will likewise be returned to the retracted position shown in FIG. 2. In this manner, the ejection elements (e.g., core lifter blades 60 and ejector pins 70) will be retracted out of the molding cavity.

Figure 2A:
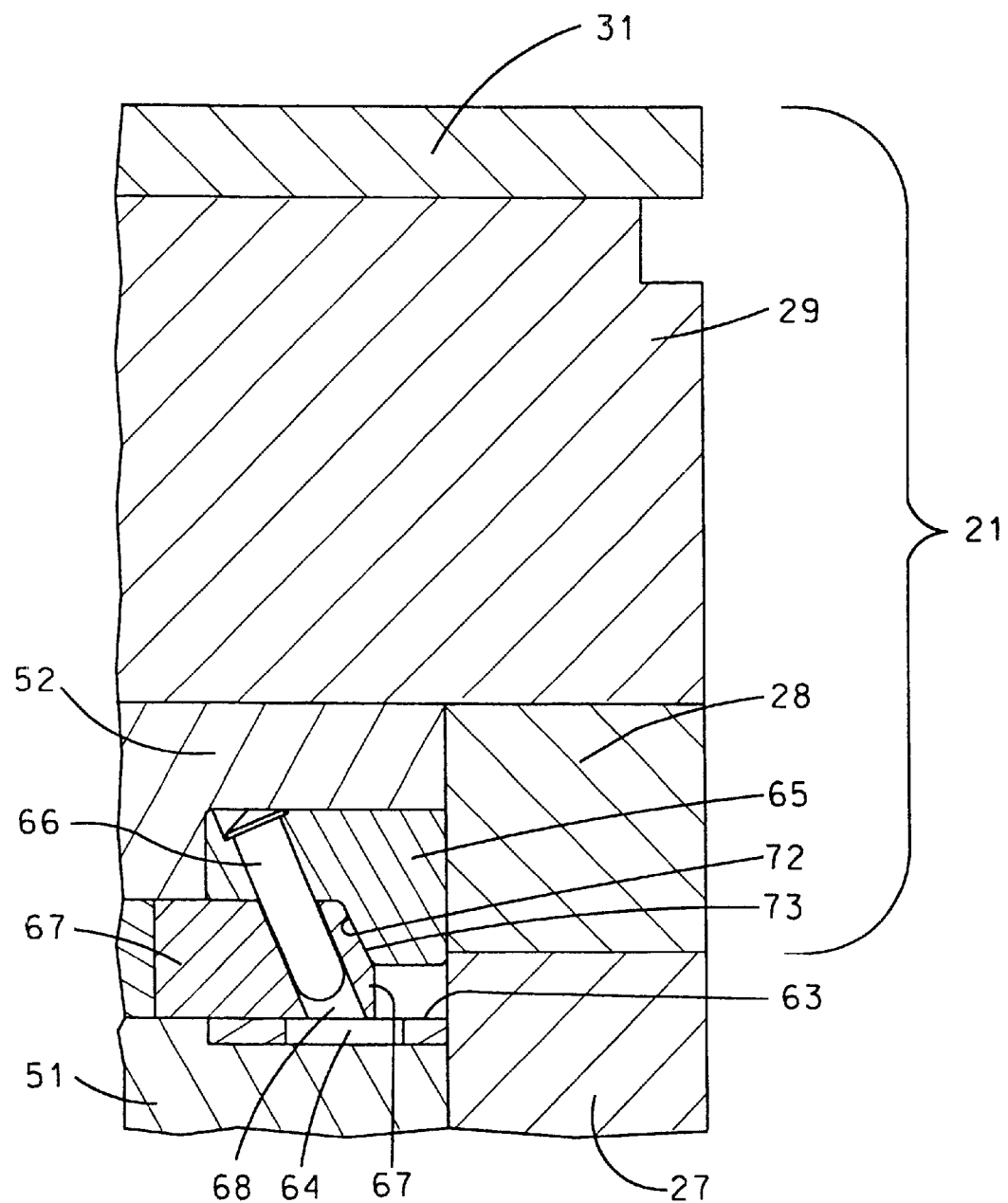
FIG. 2A is an enlarged view of a position of FIG. 2 depicting details of a side action.

The core and cavity modules of the system according to the present. invention may also include side actions therein. Side actions may be needed, for example, in order to allow for the molding and release of external undercuts. Side actions (also referred to as cam actions) essentially allow for a portion of the molding cavity to be pulled laterally away from the molded part when the mold is opened. As best seen in FIGS. 2 and 2A, each side action generally comprises an upper slide assembly 65 which is secured to cavity insert 52 and a lower slide assembly 67 which is slidably mounted on core insert 51. Upper slide assembly 65 includes an angle pin 66 which extends downwardly away from lower slide assembly 67 at an angle thereto. Upper slide assembly 65 may also include a cam surface 72 (see FIG. 2A) which extends substantially parallel and adjacent to angle pin 66.

Lower slide assembly 67 is slidably positioned on top of a wear plate 63 in core insert 51. Lower slide assembly 67 also includes an angled bore 68 which is sized and configured to accommodate angle pin 66 therein. Wear plate 63 may also include an aperture 64 through which angle pin 66 may pass, as needed. A cam surface 73 is also provided on lower slide assembly 67, and extends parallel and adjacent to angled bore 68. Slide nose 69 (also referred to as a slide insert) may be attached to the end of lower slide assembly 67 which is opposite cam surface 73. Slide nose 69 is shaped for forming a portion of the molded part, such as an external undercut region. In other words, slide nose 69 will actually define part of the periphery of molding cavity 85.

As seen in FIG. 2, when the molding press is closed and core insert 51 and cavity insert 52 are brought together, each angle pin 66 will be positioned within a corresponding angled bore 68 of lower slide assembly 67. In this manner, angle pins 66 will ensure that each slide nose 69 is advanced inwardly so as to form portions of molding cavity 85. When molding is completed and the molding press is opened (see FIG. 6), angle pin 66 will move upwardly away from lower slide assembly 67. Angle pin 66 as well as cam surface 72 will therefore cause lower slide assembly 67 to slide outwardly away from molding cavity 85 (as best seen in FIG. 6). In this manner, slide noses 69 will be moved away from molded part 89 in order to allow the part to be removed.

As best seen in the top plan view of FIG. 4, each core insert 51 may be configured to accommodate side actions at up to four or more locations about the periphery of the core insert. Of course it will be understood that blanks may be inserted in place of one or more of the slide assemblies when side actions are not needed for molding purposes. Lower slide assemblies 67 are held in place by conventional retainer gibs which are not shown.

As mentioned previously, one of the advantages of the modular molding system of the present invention is that it provides for rapid mold changeovers. Neither the frame assembly, nor the master ejection system provided in the frame assembly, need be removed or altered in any way during mold changeovers. Rather, the core and cavity insert modules are merely replaced with a new set in order to mold a different part. In addition, both the core and cavity insert modules are face mountable, thus providing for in press mounting and removing of the modules. In other words, the frame assembly and associated master ejection system may remain in the molding press when mold changeovers take place, and the modules need not be slid into the frame assembly from the side.

Figure 5:
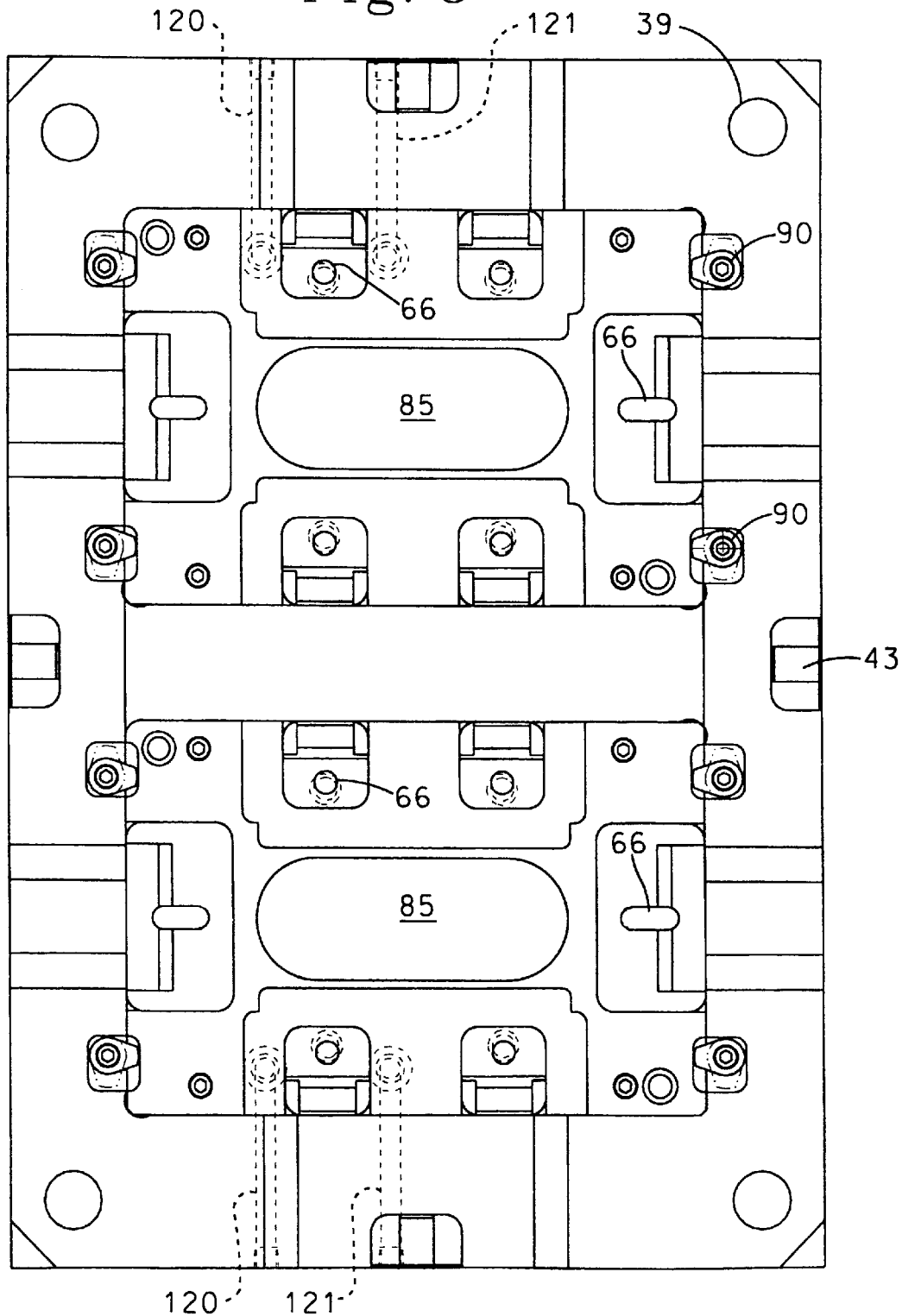
FIG. 5 is a bottom plan view of the upper half of the system of FIG. 1.

Cavity insert 52 may be mounted in upper frame assembly 21 by merely inserting cavity insert 52 into one of the rectangular openings 47 provided in A-plate 28. A plurality of rotatable latch members 90 are provided in suitable cutout regions in A-plate 28. Latch members 90 are simply rotated over cavity insert 52 in order to hold insert 52 in place (as shown in FIG. 5). Once latch members 90 have been tightened, cavity insert 52 is securely held in place.

The core insert module is inserted into lower frame assembly 22 in a similar manner. The core insert module is inserted through rectangular opening 46 in B-plate 27 such that the module ejector system will pass through rectangular opening 45 of support plate 26. First module ejector plate 53 is secured to first master ejector plate 35, as described previously, while second module ejector plate 55 is secured to second master ejector plate 37. Rotating latch members 90 are once again provided in suitable cutouts in B-plate 27, and may be employed to hold core insert 51 securely within rectangular opening 46 of B-plate 27. No other adjustments to the core and cavity modules, or for that matter the frame assembly, are needed, since all of the mechanical actions (such as the side actions and the ejection elements) are incorporated into the modules.

It is often desirable to provide for water cooling during ejection molding in order to provide precise temperature control during the molding operation. While conventional systems provide water cooling in the frame assembly only, the modular molding system of the present invention provides water circuits within the core and cavity inserts 51 and 52 in order to more efficiently cool the molded part.

Figure 13:
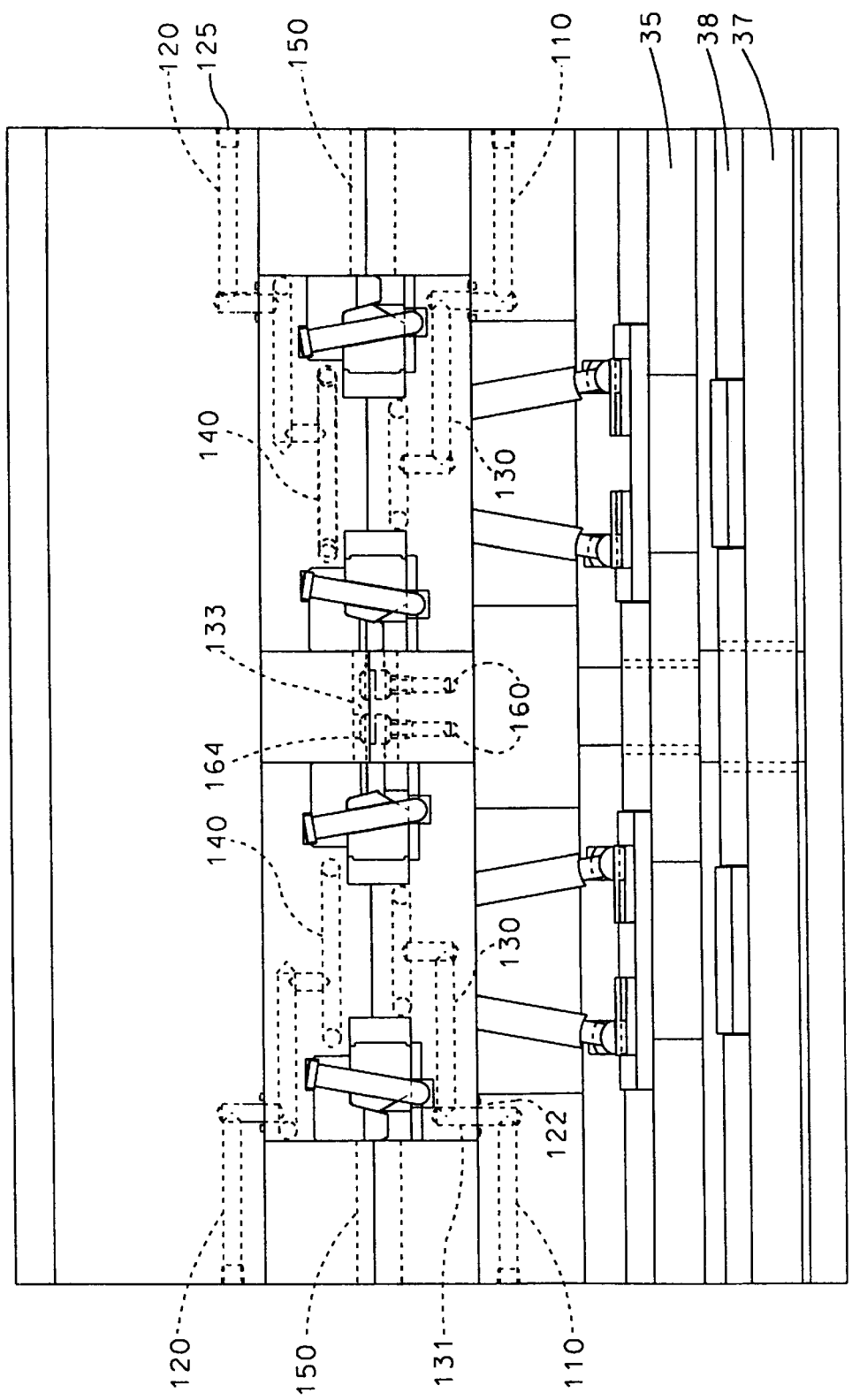
FIG. 13 is a view similar to FIG. 3, wherein cooling lines of the molding system are shown.

As best seen in FIGS. 4 and 13, fluid inlet lines (or passageways) 110 and fluid outlet lines 111 may be provided on opposite sides of the lower frame assembly, extending through support plate 26. Fluid lines 110 and 111 terminate at the upper surface of support plate 26, adjacent the periphery of the rectangular openings 46 provided in B-plate 27. Thus, fluid lines 110 and 111 terminate at the portion of the upper surface of support plate 26 which supports core insert 51. A fluid circuit 130 (see FIG. 13) may be provided in each core insert 51, and includes an entrance 131 configured for mating engagement with fluid exit 122 of fluid inlet line 110. Fluid circuit 130 traverses through core insert 51 in any of a variety of patterns, and that shown is merely exemplary of one possible arrangement. Fluid circuit 130 terminates in a fluid exit which is configured for mating engagement with fluid entrance 123 (see FIG. 4) of fluid outlet line 111. In this manner, cooling water (or other fluid) may be urged through a fluid inlet line 110 into fluid circuit 130 of a core insert 51 (through fluid entrance 131), circulated through fluid circuit 130 then into fluid outlet line 111, and eventually out of the molding system.

As best seen in FIGS. 5 and 13, fluid inlet lines 120 and fluid outlet lines 121 may similarly be provided on opposite sides of the upper frame assembly, extending through manifold plate 29. Fluid lines 120 and 121 terminate at the under surface of manifold plate 29, adjacent the periphery of the rectangular openings 47 provided in A-plate 28. Thus, fluid lines 120 and 121 terminate at the portion of the under surface of manifold plate 29 which engages the upper surface of cavity insert 52. A fluid circuit 140 may be provided in each cavity insert 51 (see FIG. 13), and is configured for mating engagement with fluid inlet line 120 and fluid outlet line 121, in the manner described above for fluid circuit 130. Fluid circuit 140 traverses through cavity insert 52 in any of a variety of patterns, and that shown is merely exemplary.

A variety of connection elements may be provided in order to provide fluid communication between the fluid circuits of the core and cavity inserts 130 and the fluid inlet and outlet lines of the frame assembly. For example, simple counterbores may be provided at the entrance and exit of each fluid circuit 130 and 140, and compression-type O-rings may be positioned within the counterbores in order to provide a water-tight seal when the core and cavity inserts are mounted in the frame assembly. Of course any of a variety of other connection elements may be used to provide sealed, fluid communication between the fluid circuits and their corresponding inlet and outlet lines in the frame assembly. In addition, conventional threaded connections (e.g., threaded connection 125 shown in FIG. 13) may be provided adjacent the outer surface of the frame assembly such that water hoses (or other fluid lines) from the molding press may be connected to the fluid inlet and outlet lines of the frame assembly.

The molding system of the present invention also provides for water cooling within the side actions themselves.

Figure 14:
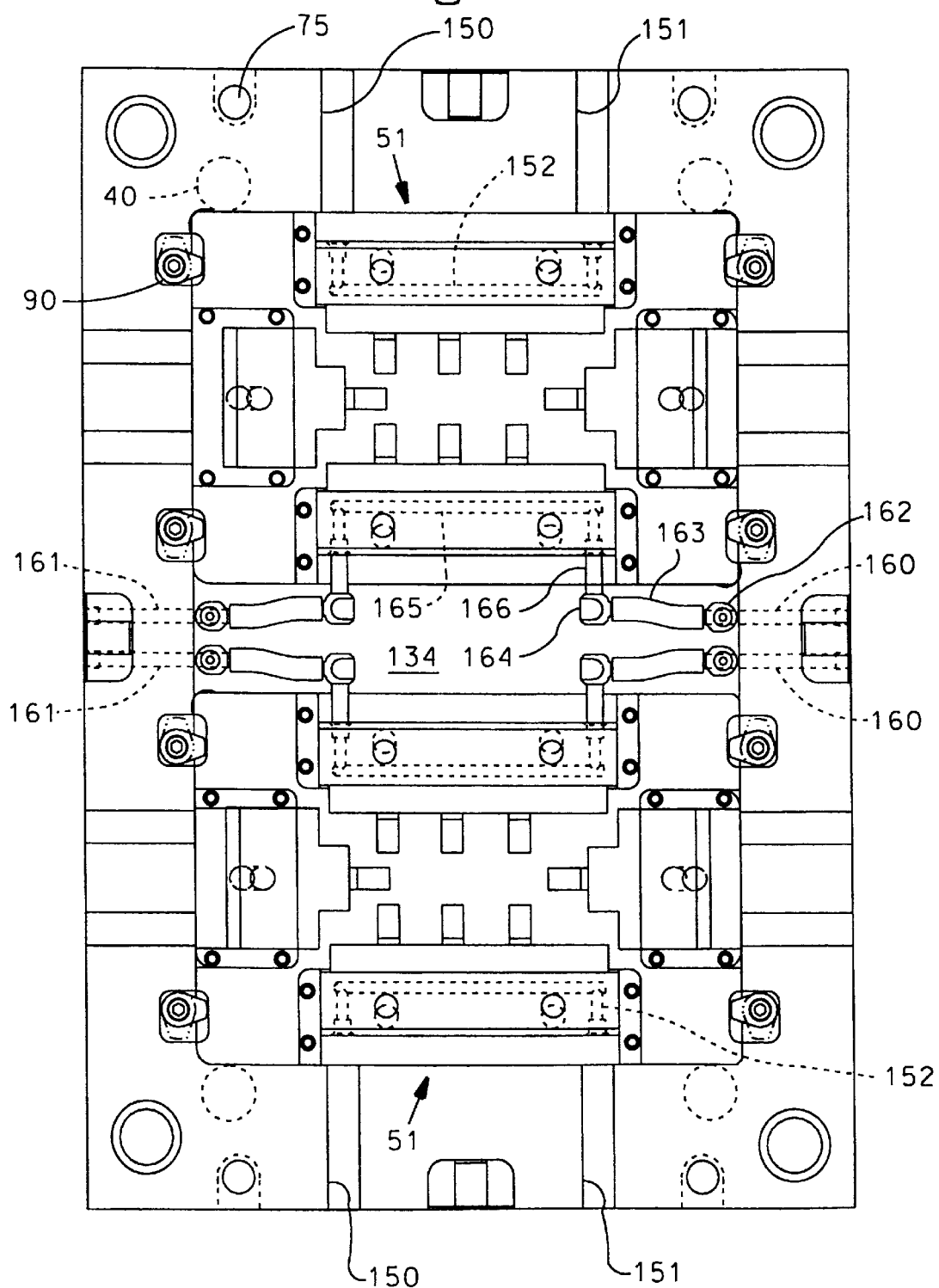
FIG. 14 is the same view as FIG. 4, wherein slide assembly cooling circuits are shown.

Thus, as best seen in FIG. 14, fluid inlet and outlet passageways 150 and 151, respectively, extend from the periphery of the frame assembly towards the side actions of the core and cavity insert. Passageways 150 and 151 preferably extend through a portion of B-plate 27 and A-plate 28, as best seen in FIG. 13. A fluid circuit 152 extends through each of the lower slide assemblies (FIG. 14), and each fluid circuit is configured such that flexible or expandable water hoses positioned within passageways 150 and 151 will sealingly engage the entrance and exit of the cooling circuit (such as by using threaded connectors). In this manner, fluid inlet and outlet hoses positioned within passageways 150 and 151 may be used to circulate cooling water though the lower slide assemblies 67. In addition, since passageways 150 and 151 are preferably oriented perpendicular to the line of travel of the slide assemblies, the water hoses will simply move (or stretch) with the slide assemblies and remain in fluid communication with cooling circuit 152.

With respect to the slide assemblies located along the interior side of each core insert, a cooling circuit 165 is once again provided therein. A recess 133 is provided along the center beam of B plate 27, and a corresponding recess 134 is provided in A plate 28. Recesses 133 and 134 thus define a space between A-plate 28 and B-plate 27 which provides room for fluid lines to the interior side actions. Fluid inlet and outlet lines 160 and 161, respectively, extend through B plate 27 from opposite sides of the frame assembly towards the central interior of the molding system, and are routed upwardly towards the space defined by recesses 133 and 134. A connector 162 is aligned with each fluid line 160 and 161, and is positioned within atop the center beam of A plate 28 (i.e., on recess 134). A flexible hose 163 extends away from each connector 162 and provides fluid communication between connector 162 and a second connector 164. Second connector 164 is in fluid communication with a fluid line 166, which in turn is in fluid communication with a fluid circuit 165 provided within the lower slide assembly. Thus, water urged through fluid line 160 will be directed by first connector 162 through hose 163, and then is directed by second connector 164 through line 166 into cooling circuit 165. The water will exit on the opposite side of the frame assembly, through passageway 161. Once again threaded connectors (or other means known to those skilled in the art) may be provided adjacent the exterior surface of B-plate 27 so that water lines from the molding press may be connected to fluid lines 160 and 161, in fluid communication therewith, thereby allowing cooling water (or other fluid) to be routed to the interior side actions.

The molding system of the present invention also allows for negative pressure molding whereby a vacuum may be applied to the molding cavity, as desired. Thus, various vacuum lines may be in a manner similar to that of the fluid lines described previously. Thus, as shown in FIG. 4, one or more vacuum lines 170 may be provided in support plate 26, in the same manner as fluid lines 110. As with fluid lines 110, vacuum lines 170 may terminate at the upper surface of support plate 26, adjacent to the periphery of the rectangular openings 46 provided in B-plate 27. Thus, vacuum lines 170, like fluid lines 110, will terminate at the portion of the upper surface of support plate 26 which supports core insert 51. A vacuum circuit 173 (see FIG. 4) may be provided in each core insert 51, as desired, and is configured to sealingly engage one or more vacuum lines 170 when the core insert is mounted in the lower frame assembly. A plurality of vacuum ports 172 may be provided along vacuum circuit 173 in order to provide communication between vacuum circuit 173 and molding cavity 85. In other words, vacuum ports 172 are located in the upper surface of core insert 51 in a region directly beneath the molding cavity, thus allowing a vacuum to be applied to the molding cavity.

Alternatively, or in addition to applying a vacuum directly to the molding cavity, it is common to provide one or more core vents adjacent to the main surface of the core insert (i.e., adjacent to the molding cavity). For example, a core vent 175 may be provided at 175, as shown in FIG. 4. Vacuum port 172A is thus positioned away from the molding cavity, but is in fluid communication with the core vent at 175. Thus, a vacuum may be applied to the core vent, through vacuum line 170A.

A suitable connector may be provided on vacuum lines 170, adjacent the exterior surface of support plate 26, such as threaded connectors 171 shown in FIG. 4. In this manner, external vacuum lines (e.g., a flexible hose from the vacuum source) may be attached to the molding system using connectors 171.

In order to monitor the pressure within the molding cavity, one or more pressure sensors may also be provided. Thus, as shown in FIG. 2, one or more pressure sensors 183 may be positioned beneath on or more ejection elements (such as ejector pin 70). In the exemplary embodiment of FIG. 2, pressure sensor 183 is located in a recessed area of second module ejector plate 55, directly beneath the base of ejector pin 70. In this manner, pressure within molding cavity 85 will be transmitted to sensor 183 through ejector pin 70, thus allowing sensor 183 to detect the pressure within molding cavity 85.

The molding system is configured such that when the core module is in place, pressure sensor 183 may be placed in electrical communication with the molding press so that the detected pressure within the molding cavity can be employed to regulate and monitor the molding operation. Thus, an electrical connector 186 may be provided in second master ejector plate 37, and is located and configured for mating engagement with an electrical connector provided in the base of second module ejector plate 55 (not shown). In this manner, then second module ejector plate 55 is positioned atop second master ejector plate 37, electrical connector 186 will be in electrical communication with the electrical connector provided in the base of second module ejector plate 55 (which in turn is in electrical communication with sensor 183). Another electrical connector 185 is provided on the exterior of the molding system (such as on the side of bottom clamp plate 23), and is configured for connection to the molding press or other apparatus used to monitor molding cavity pressure. An electrical line 184 (or other suitable means) may be provided in order to provide electrical communication between connector 185 and connector 186, and may be routed through second master ejector plate 37 and bottom clamp plate 23, as shown. Thus, when connector 185 is placed in electrical communication with the electronics of the molding press (e.g., a pressure monitoring circuit of the molding press), sensor 183 will provide an electrical signal indicative of the pressure within molding cavity 85 to the molding press. It will be understood that any number of pressure sensors may be positioned within the molding system of the present invention, and that shown is merely exemplary.

Finally, it will be understood that the attached figures do not depict the manner in which plastic is injected into the molding cavity. It will be understood, however, that any of a variety of systems may be used for this purpose, and would typically be mounted in and/or attached to manifold plate 29. Edge or direct sprue gating to each molding cavity may be employed, or, more preferably, a hot runner or a hot to cold sub-runner system. These systems for injecting plastic into the molding cavity are well-known to those skilled in the art, and need not be described further herein.

What I claim is:

1. A modular molding system, comprising:
   (a) an upper frame assembly configured for receiving a cavity module therein;
   (b) a lower frame assembly configured for receiving a core module therein, said lower frame assembly including a two-stage master ejector system for assisting in ejecting a workpiece in two stages, said master ejector system comprising first and second master ejector plates, said first master ejector plate including an access opening therethrough;
   (c) a cavity module positioned within said upper frame assembly; and
   (d) a core module positioned within said lower frame assembly, said core module including a two-stage ejector system having a plurality of ejection elements associated therewith, said two-stage ejector system configured for assisting in ejecting a workpiece in two stages, wherein said ejector system of said core module comprises a module ejector plate having a maximum dimension less than a maximum dimension of said access opening and configured to be inserted through said access opening for attachment to said second master ejector plate;

wherein said core and cavity modules together define a molding cavity for molding a workpiece therein, and further wherein said master ejector system is operable to drive said ejection elements of said core module.

2. The molding system of claim 1, further comprising a slide assembly mounted to said core and cavity modules.

3. A modular molding system, comprising:
   (a) an upper frame assembly configured for receiving a cavity module therein;
   (b) a lower frame assembly configured for receiving a core module therein, said lower frame assembly including a two-stage master ejector system for assisting in ejecting a workpiece in two stages, said master ejector system comprising first and second master ejector plates, said first master ejector plate including an access opening therethrough;
   (c) a cavity module positioned within said upper frame assembly; and
   (d) a core module positioned within said lower frame assembly, said core module including a two-stage ejector system having a plurality of ejection elements associated therewith, said two-stage ejector system configured for assisting in ejecting a workpiece in two stages, wherein said ejector system of said core module comprises first and second module ejector plates, said first module ejector plate having a dimension greater than a dimension of said access opening and said second module ejector plate having a maximum dimension less than a maximum dimension of said access opening, such that said first module ejector plate is configured to interfere with said access opening while said second module ejector plate is configured to be inserted through said access opening.

wherein said core and cavity modules together define a molding cavity for molding a workpiece therein, and further wherein said master ejector system is operable to drive said ejection elements of said core module.

4. A modular molding system, comprising:
   (a) an upper frame assembly configured for receiving a cavity module therein;
   (b) a lower frame assembly configured for receiving a core module therein, said lower frame assembly including a two-stage master ejector system for assisting in ejecting a workpiece in two stages, said master ejector system comprising first and second master members, said first master member including an access opening therethrough;
   (c) a cavity module positioned within said upper frame assembly;
   (d) a core module positioned within said lower frame assembly, said core module including a two-stage ejector system for assisting in ejecting a workpiece in two stages, said ejector system of said core module comprising a module member and an ejection element, said module member having a maximum dimension less than a maximum dimension of said access opening, and said module member is configured to be inserted through said access opening for attachment to said second master member; and wherein said core and cavity modules together define a molding cavity for molding a workpiece therein, and wherein said master ejector system is operable to drive said ejection element of said core module.

5. The molding system of claim 4, wherein at least one of said module member and master members comprises an ejector plate.

6. The molding system of claim 5, wherein said at least one of said module member and master members further comprises a retainer plate.

7. The molding system of claim 4, further comprising an additional module member having a dimension greater than a dimension of said access opening, wherein said additional module member is configured to interfere with said access opening.

8. A modular molding system, comprising:
   (a) an upper frame assembly configured for receiving a cavity module therein;
   (b) a lower frame assembly configured for receiving a core module therein, said lower frame assembly including a two-stage master ejector system for assisting in ejecting a workpiece in two stages, said master ejector system comprising first and second master members;
   (c) a cavity module positioned within said upper frame assembly;
   (d) a core module positioned within said lower frame assembly, said core and cavity modules together define a molding cavity for molding a workpiece therein, said first master member being located closer to said molding cavity than said second master member, said core module including a two-stage ejector system for assisting in ejecting a workpiece in two stages, said ejector system of said core module comprising a module member and an ejection element, said module member being provided with a fastening device for removably attaching said module member to said second master member, wherein said fastening device may be accessed to removably attach said module member to said second master member without disassembling said first or second master members; and wherein said master ejector system is operable to drive said ejection element.

9. The molding system of claim 8, wherein at least one of said module member and said master members comprises a plate.

10. The molding system of claim 8, wherein said first master member includes an access opening therethrough.

11. The molding system of claim 10, wherein said access opening permits access to said fastening device to removably attach said module member to said second master member without disassembling said first or second master members.

12. The molding system of claim 10, wherein said module member has a maximum dimension that is less than a maximum dimension of said access opening, wherein said module member is configured to be inserted through said access opening for attachment to said second master member.

13. The molding system of claim 10, wherein said core module comprises another module member with a dimension that is greater than a dimension of said access opening, wherein said another module member is configured to interfere with said access opening.

14. The molding system of claim 8, further comprising a fluid circuit in at least one of said core module and said cavity module, said fluid circuit configured such that a fluid may be circulated therethrough.

15. The molding system of claim 8, further comprising a vacuum circuit in at least one of said core module and said cavity module, said vacuum circuit configured such that a vacuum may be applied to said molding cavity.

* * * * *